Sept. 16, 1941.  A. A. MacDONELL  2,256,210
ANIMAL FEEDING DEVICE
Filed Nov. 17, 1939  2 Sheets-Sheet 1
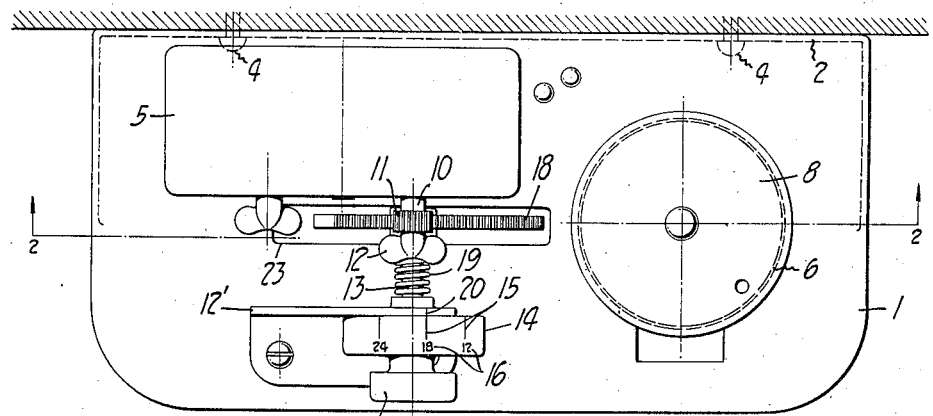
FIG_1_
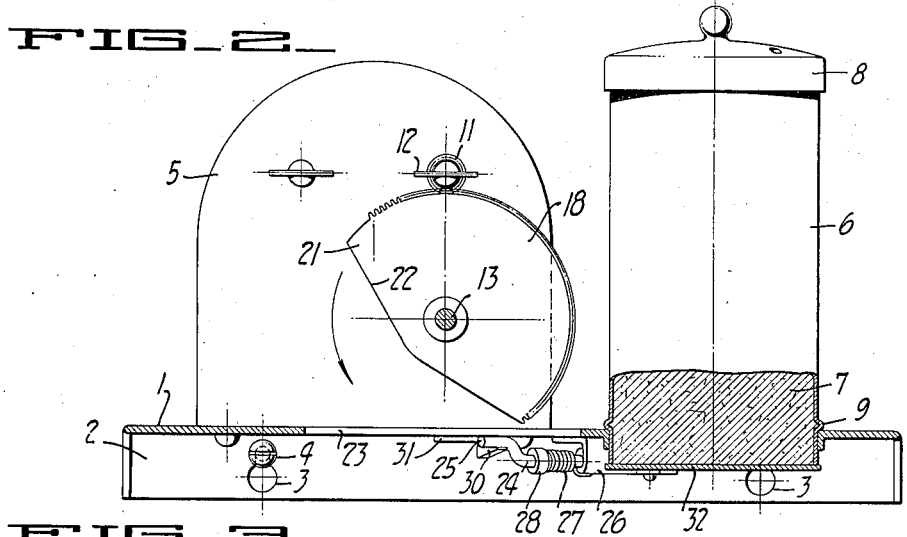
FIG_2_
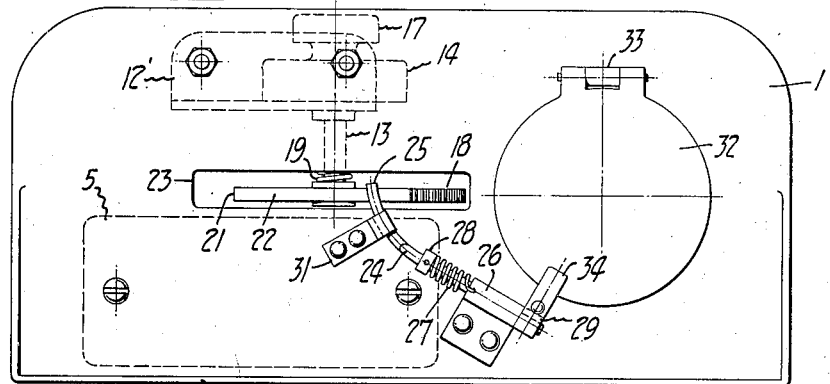
FIG_3_
INVENTOR
Alberta A. MacDonell
BY Boyken & Mohler
ATTORNEYS Sept. 16, 1941.  A. A. MacDONELL  2,256,210
ANIMAL FEEDING DEVICE
Filed Nov. 17, 1939  2 Sheets-Sheet 2
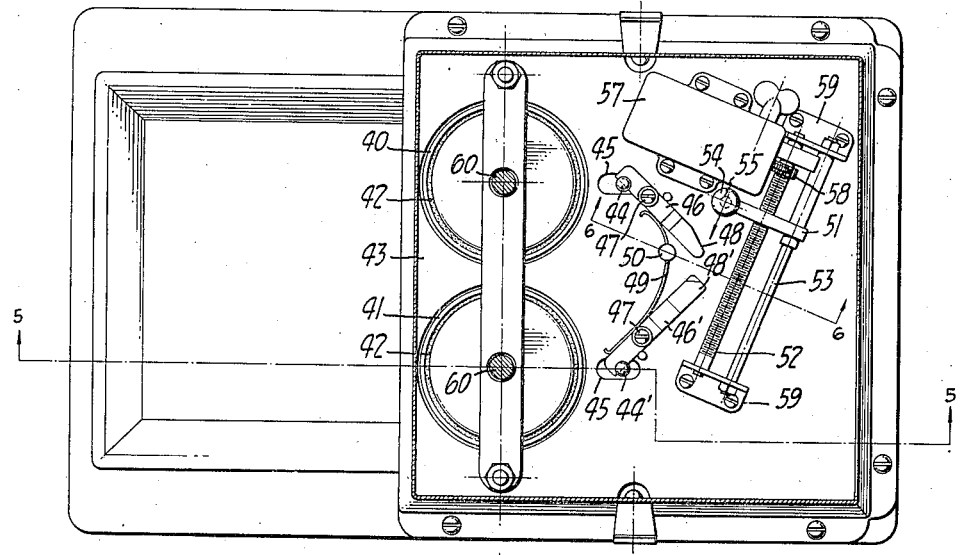
FIG_4_
FIG_5_
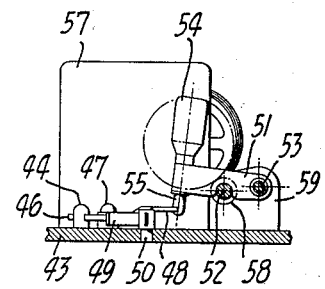
FIG_6_
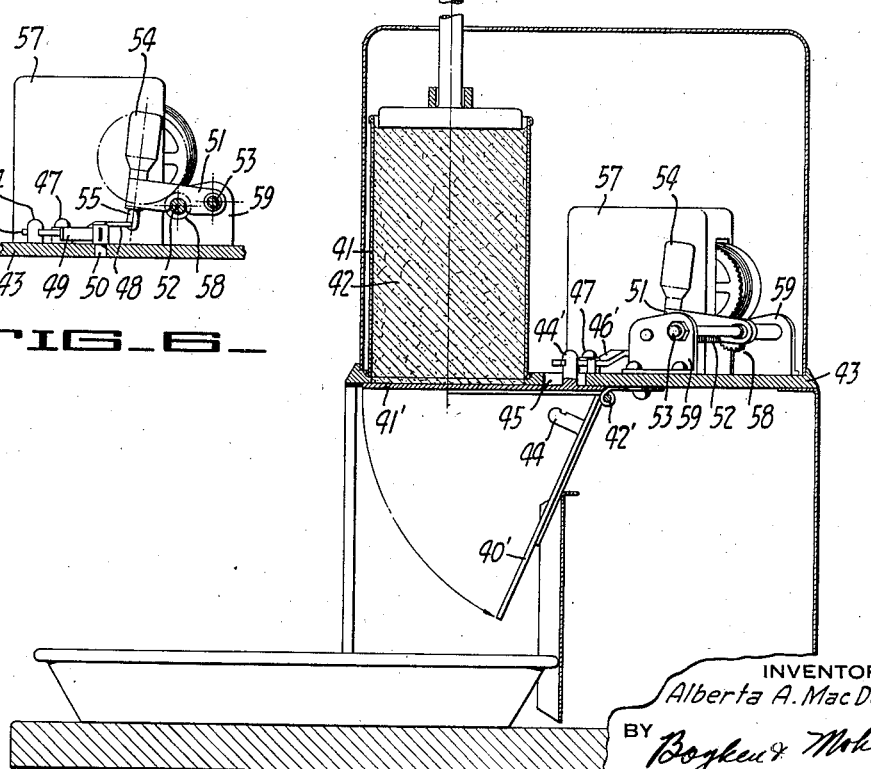
INVENTOR
Alberta A. MacDonell
BY
ATTORNEYS Patented Sept. 16, 1941

2,256,210

UNITED STATES PATENT OFFICE 2,256,210

ANIMAL FEEDING DEVICE

Alberta A. MacDonell, San Francisco, Calif.

Application November 17, 1939, Serial No. 304,929

5 Claims. (Cl. 161—10)

This invention relates to an animal feeding device, and is a continuation in part, of co-pending application Ser. No. 223,865, filed August 9, 1938, now Patent 2,189,213.

This invention has for its objects an improved power actuated device adapted to hold a quantity of cat or dog food, or the like, and to dispense such food for eating thereof by the animal, at a predetermined time after filling and commencing actuation of the power effective to cause the dispensing of said food. Another object is the provision of improved means for causing the dispensing of food from a container at a predetermined time and a still further object is the provision of a food dispensing device of the above character that is easily and quickly filled with food, cleaned, and in which there is a constant speed motor and food release means actuated thereby, said latter being quickly adjustable to a plurality of positions for setting its actuation by the motor at any desired time. A still further object is the provision of a support for supporting all of the elements essential to operation of the device, in a compact unit spaced above a floor or other surface, and one of said elements comprising a quickly removable tubular member adapted to hold food therein for dispensing therefrom. Other objects and advantages will appear in the specification and drawings.

In the drawings,

Fig. 1 is a plan view of one form of the invention.

Fig. 2 is a sectional view taken along line 2—2 of Fig. 1.

Fig. 3 is a bottom plan view of the apparatus of Fig. 1.

Fig. 4 is a plan view of another form of the invention with the protective top covering removed to disclose the working elements of the invention.

Fig. 5 is a sectional view taken along line 5—5 of Fig. 4.

Fig. 6 is a sectional view taken along line 6—6 of Fig. 4.

In detail the device of Figs. 1 to 3 comprises a substantially flat plate 1, adapted to be supported horizontally from a vertical wall or similar support, by a right angle flange 2 along one edge, which flange is provided with key hole slots 3 (Fig. 2) for receiving the heads of screws 4 (Fig. 1) therethrough, the narrower end of the recesses being nearest the plate 1 so as to pass the shanks of the screws, with the heads engaging the margins of the slots.

Secured on the upper side of plate 1 is a conventional clock 5 with its face and hands facing towards the flange 2 for ready observation thereof and along side said clock said plate is formed with a circular opening adapted to pass therethrough the lower end of a vertically extending cylindrical tube 6, within which the food 7 is adapted to be supported. Tube 6 is provided with a removable top 8 and an annular outwardly projecting ridge 9 is formed around the lower end of the tube, which ridge is adapted to seat around the edges of the opening in said plate so as to support the tube in position on the plate, extending upwardly therefrom. The opening in plate 1 is formed with a notch in the side opposite flange 2 for passing the hinge attaching the closure to the tube 6, which will be described later.

The conventional spring winding shaft 10 that projects from the rear side of said clock is provided with a spur gear 11 and a key 12 outwardly of said gear, with respect to the clock, for winding the spring in the latter.

Secured on plate 1 behind said clock, is an upwardly projecting bracket 12' journalled at its upper end for a horizontal shaft 13. The shaft 13 rotatably extends through the bearing in said bracket to opposite sides thereof, and the end of the shaft outwardly of said bracket, with respect to the clock side, carries a disk 14 with a row of graduations 15 thereon, respectively identified by numerals 16, such as "6", "12", "18", "24", etc. Also the same end of said shaft carries a turning knob 17 thereon for manually turning the shaft and disk, said disk and knob being secured to the shaft against rotation relative thereto.

The end of the shaft 13 extending toward clock 5 from the side of the bracket adjacent said clock, is provided with a gear segment 18 (Fig. 2, which segment is extended around substantially half a circle. The teeth of said segment are concentric with said shaft, but the remainder of the segment is cut away, and between said segment 18 and bracket 12' is an expansion coil spring 19 that tends to hold the disk 14 against the bracket 12', with the teeth of the segment in mesh with gear 11 when the shaft 13 is turned to bring the teeth of the gear and segment into engagement. It is to be noted that shaft 13 is movable axially upon pulling the knob 17 outwardly relative to said bracket, the spring 19 being compressed during such movement.

The purpose of the foregoing arrangement is to permit the setting of the segment 18 with respect to gear 11, so that the former will be moved through a greater or lesser distance according to the point around the teeth on segment 14 where said teeth are placed in mesh with the gear 11. For example, upon pulling knob 17 outwardly, with respect to bracket 12' and clock 5, the segment 18 will also be carried away from the gear 11, and can then be manually turned free from the gear, so as to bring one of the graduations 15 in alignment with a mark 20 on one edge of said bracket. Upon releasing the knob, the segment will be moved automatically into mesh with gear 11 at the point around said segment corresponding, generally, to the position of the particular graduation in register with said mark.

In the drawings, the numeral "18" on disk 14 which designates one of the graduations 15, is in registration with mark 20, and the position of said numeral with respect to the teeth on segment 18 is such that eighteen hours later the gear 11 will reach the end of the row of teeth on said segment, thus stopping further actuation of the segment. Similarly, if the disk is set so the numeral "6" is in registration with mark 20, then six hours is the limit of movement of segment 18.

Extending beyond the leading end of the row of teeth on segment 18, said segment is provided with a projection 21, which revolves with the segment. The segment with its teeth and said projection, are preferably stamped from a single piece of sheet metal, and the leading edge 22 of said projection, extends generally radially of the axis about which the segment revolves, as best indicated in Fig. 2.

Plate 1 is provided with a slot 23 through which said segment and projection 21 and the edge 22 are adapted to project to below the plate 1 when the segment is revolved and below said plate I provide a horizontally disposed shaft 24 with one end 25 curved to form a crank, which crank end extends upwardly towards and then across said slot. Said shaft 24 rotatably extends through a bearing 26, and the end opposite end 25 projects from said bearing adjacent an edge of the opening in which tube 6 is supported. An expansion coil spring 27 surrounds a portion of said shaft 24 at a point between its crank end 25 and bearing 26, said spring reacting between the bearing and a collar 28 secured on said shaft to hold the shaft in a position in which a stop 29 on said end opposite the crank end 25 is held against a side of said bearing. At the same time said spring tends to urge the crank end 25 into a notch 30 in the side of member 31 that projects downwardly from the under side of plate 1. When shaft 24 is in the aforesaid position, the same is held against revolving by reason of the fact that crank end 25 is in said notch 30, unless and until said crank end is forceably moved out of said notch.

The bottom end of tube 6 carries a closure plate 32 hinged at 33 to the side of said tube at a point generally opposite the stop 29 on shaft 24, and an arm 34 extends from said stop and perpendicularly to shaft 24, to a position across the marginal edge of closure 32, thus holding the closure in position extending over the lower open end of tube 6 supporting food thereon. Upon rotation of shaft 24 in direction to revolve arm 34 away from the closure, the latter will swing open, by gravity, and the food in the tube will be discharged.

In operation, when segment 18 is revolved in the direction of the arrow in Fig. 2, the leading edge 22 thereof will engage the crank end 25 either 6, 12, 18 or 24 or more hours after the time for which the segment is set as already described. Obviously any setting may be had between the range of times indicated on disk 14. Upon engagement between said edge 22 and crank end 25, and upon continued movement of said edge, the shaft 24 will be caused to revolve to a position in which crank end 25 is forced out of notch 30 and to a position in which arm 34 is moved from below closure 32, and the closure automatically will fall away to discharge food 7 from within the tube 6. The top 8 of the tube may be provided with one or several openings 38 therein to prevent formation of a vacuum above the food where the food is relatively moist and tends to stick.

The plate 1, supporting the tube 6 and other elements above described, is hung from a wall, post or other support, at a level appreciably above the floor, and a pan is placed on the floor below the tube 6 for catching the food dropped therefrom.

In the drawings indicated in Figs. 4 to 6, I show another form of the invention, in which a pair of tubes 40, 41, are provided in side by side relation, for enclosing food 42 therein. Said tubes are supported on a horizontal plate 43 provided with openings therein, the lower ends of said tubes being supported at the edges of the openings. A pair of closure plates 40', 41' cover the lower ends of tubes 40, 41, respectively, said plates being hinged at 42' to plate 43 at points adjacent the edges of said openings for swinging away from the lower ends of the tubes 40, 41.

Plates 40', 41', respectively, carry short stub rods 44, 44' on their sides facing plate 43, which rods extend through openings 45 in said plate to points above the upper side of said plate. The portions of stub rods 44, 44' that project above plate 43 are notched at one of their sides to receive one of the lateral edges of one of the ends of levers 46, 46' thereon, said levers each being pivoted to plate 43 at a point 47 between its ends, and the opposite ends 48, 48' of the levers are slightly bent upwardly with respect to the upper side of plate 43. A leaf spring 49, secured to a post 50 between its ends to plate 43, reacts at one end against end 48 of lever 46 and the end of lever 46' that is between pivot 47 and stub rod 44', thus tending to force the ends of the levers 46, 46' that engage stub rods 44, 44' into the recesses formed in one of the sides of each of said rods, thereby holding the closures 40', 41' in position closing the lower ends of tubes 40, 41.

It will be seen from the above that upon movement of ends 48, 48' of the levers in one and the same direction, the stub rods will be freed of engagement with the levers, and the closures will swing downwardly by gravity to open the tubes and to dispense the food therein.

The above movement of said levers is effected by a traveling nut 51 threadedly engaging a threaded rod 52 that extends across the ends 48, 48' of the levers. Said nut is slidably and rotatably supported on a smooth rod 53 that is parallel with rod 52. The nut 51 is only a half nut, with its concave threaded side facing downwardly and against the rod 52, thus its threaded engagement with the threads on rod 52 is disconnected merely by swinging the nut upwardly about rod 53. The end of nut 51 that projects across the rod 52 away from rod 53 carries a weighted member 54 to insure the threads on the nut remaining in engagement with the threads on rod 52 and a projection 55 extending from the lower side of said end of the nut is adapted to engage the ends 48, 48' of levers 46, 46' in succession as the nut is carried along rod 52 in one direction by rotation of said rod. Thus the projection will first cause lever 46 to swing out of engagement with stub rod 44, and then upon continued movement will cause lever 46' to move out of engagement with stub rod 44', thus necessarily releasing the closures 40', 41' for falling.

The movement of nut 51 and projection 55 therein is caused by conventional spring motor 57, connected by conventional gearing to drive a spur gear 58 on one end of rod 52. Rod 52 is rotatably mounted at its opposite ends in brackets 59 secured to plate 43. The ends of rod 53 are also secured to said brackets.

In operation, with the nut 51 at the one end of rod 52, as indicated in Fig. 4, the pitch of the threads and speed of the rod 52 are such that within about twelve hours' time the projection 55 will engage lever end 48 and will release closure 40', and twelve hours later the projection 55 will engage end 48' of lever 46' and will release closure 41'. The end 48' of lever 46' is slightly longer than lever end 48, and after the projection 55 has disengaged lever 46' from the stub rod 44', the projection will be caused to automatically move upwardly on end 48' thus disengaging the threads on nut 51 from those on rod 52, and further movement of the nut will be stopped.

To reset the device, it is only necessary to close closure plates 40', 41' when the ends of the levers 46, 46' adjacent stub rods 44, 44' will automatically engage the recesses in said stub rods. The nut 51 is then slipped back to starting position and pivoted to re-engage its threads with those on rod 52. It is, of course, obvious that the first actuation of closure 40' may be at any desired point from one to twelve hours, according to how close nut 51 is positioned with respect to end 48 of lever 46.

To facilitate ejection of the food 42 within the tubes, I provide a weighted plunger 60 over each tube. These plungers are also adapted to substantially cover the food in each tube, and to readily slide longitudinally through the tubes.

The tubes themselves are adapted to be quickly removed from the plate 43 for cleaning and the closures 40', 41' are each completely smooth over their sides that are adapted to support food thereon. Thus there are no projecting latches or other projections that will tend to catch food as the latter is ejected from the tubes.

The apparatus as disclosed in Figs. 4 to 6 inclusive, is also fully described in my prior patent already mentioned in this application.

While I am familiar with various forms of automatic feeding devices, some of which disclose hinged closures adapted to fall away from openings in the lower ends of containers, the advantages of the instant invention over such forms of devices of which I am aware do not provide for the sanitation and compactness, and positive manner of operation as the invention herein described. In this connection, I might add that the incorporation of cord or wire releases, and the like, for releasing food, is not generally satisfactory where the devices are used for feeding cats and dogs, and a positive mechanical action is most desirable from a practical standpoint.

Having described my invention, I claim:

1. A device for dispensing food for consumption by an animal comprising a cylindrical, open-ended, tubular receptacle for the food, a closure plate closing one end of the receptacle and a cylindrical plunger in axial alignment with the axis of the receptacle for movement through the receptacle axially thereof but normally closing the opposite end, means mounting said plate for movement from over said one end to open position, a plate securing means releasably securing said plate in position over said one end, and actuating means arranged and adapted to simultaneously release said plate securing means for movement of said plate to open position and to cause said plunger to fall by gravity for forcing the food within the receptacle therethrough and out of said one end, said tubular receptacle being disposed vertically and of uniform diameter throughout its length, said closure plate being disposed below and across the lower open end of the receptacle, said plunger being disposed over the upper end of the receptacle, the food adapted to be enclosed within the receptacle being supported on said plate and said plunger being gravity actuated and supported against movement by the plate and food thereon when the plate is in closed position, but free to move downwardly on the food to force the food downwardly through the lower end of the receptacle when the plate is moved to open position, and guide means cooperatively associated with said plunger for maintaining the plunger coaxial with the receptacle during said downward movement of said plunger.

2. A device for dispensing food for consumption by an animal comprising a vertically disposed, tubular, open-ended receptacle, a horizontal plate covering the lower open end of the receptacle adapted to support food therein, hinge means mounting said plate for downward swinging thereof away from said lower end, locking means releasably securing said plate covering said lower end against said downward swinging, a gravity actuated weighted member adapted to close the upper end of the receptacle and adapted to be supported on food within the receptacle, means arranged and adapted to actuate said locking means to release the same for permitting downward swinging of said plate whereby the gravity actuated member will force the food downwardly out of said lower open end, said weighted member comprising a plunger, including a shaft extending upwardly therefrom, guide means slidably supporting said shaft for downward movement of the plunger in axial alignment with the central vertical axis of said receptacle.

3. A device for dispensing food for consumption by an animal at separate, predetermined intervals comprising a plurality of receptacles for food, one of the sides of each receptacle being formed with a discharge opening, a movable closure for each discharge opening, means mounting each movable closure for movement from closed position over the discharge openings to open position away from said openings, separate means engaging the body of food adapted to be held in each receptacle on the side of the body opposite the openings for forcing the food out of the opening upon movement thereof, separate means releasably securing the closures in said closed position, a motor, movable means moved along a path of travel at a uniform rate of movement by actuation of said motor arranged and adapted to successively actuate the means releasably securing the closures at predetermined time intervals for releasing the closures for movement to open position whereby the food within each receptacle may be successively discharged from the receptacles through said discharge openings, and said separate means engaging the food within each receptacle being arranged and adapted to automatically move toward said discharge openings substantially simultaneously with movement of said movable closures to open position, means actuated by movement of the movable means that is actuated by the motor for rendering said movable means inoperative upon said movable means completing actuation of the final one of all the separate means that releasably secures the closures in closed position.

4. A device for dispensing food for consumption by an animal comprising, a housing having side walls and a top wall, a vertically disposed, open-ended, tubular receptacle enclosed within the walls of said housing with the lower open end of the receptacle opening downwardly and outwardly of the housing, a plate extending across the lower open end of the receptacle for supporting food within the receptacle, means swingingly supporting said plate for swinging downwardly to a position uncovering the lower open end of the receptacle for permitting the food within the latter to fall therefrom, locking means releasably locking said plate in position across said lower open end, power actuated means arranged and adapted to unlock said locking means, power means arranged and adapted to actuate said power actuated means at a predetermined period of time after the plate is locked in food supporting position for releasing said plate, said locking means, said power actuated means, and said power means, all being enclosed within said housing against accessibility from outside the housing, and means secured to said housing supporting the receptacle, plate, locking means, power actuated means and said power means in position enclosed within said housing for movement with said housing to any desired position.

5. A device for dispensing food for consumption by an animal comprising, a horizontal platform formed with an opening therein, a vertically disposed, open ended, tubular receptacle supported on said platform with the lower open end of the receptacle in register with and adjacent said opening, a plate extending across the lower open end of the receptacle for supporting food within the receptacle, means swingingly supporting said plate for swinging downwardly to a position uncovering the lower open end of the receptacle for permitting the food within the latter to fall therefrom, locking means releasably locking said plate in position across said lower open end, power actuated means connected with said locking means arranged and adapted to unlock said locking means, power means connected with said power actuated means arranged and adapted to actuate said power actuated means at a predetermined period of time after the plate is locked in food supporting position for releasing said plate, said locking means, said power actuated means, and said power means, all being supported by said platform adjacent to said receptacle, and means secured to said platform supporting the receptacle, plate, locking means, power actuated means, and said power means in position for movement with said platform to any desired position, as a unit.

ALBERTA A. MacDONELL.